June 13, 1944.  W. F. PECK  2,351,539
POLARIMETER APPARATUS
Filed Dec. 4, 1941
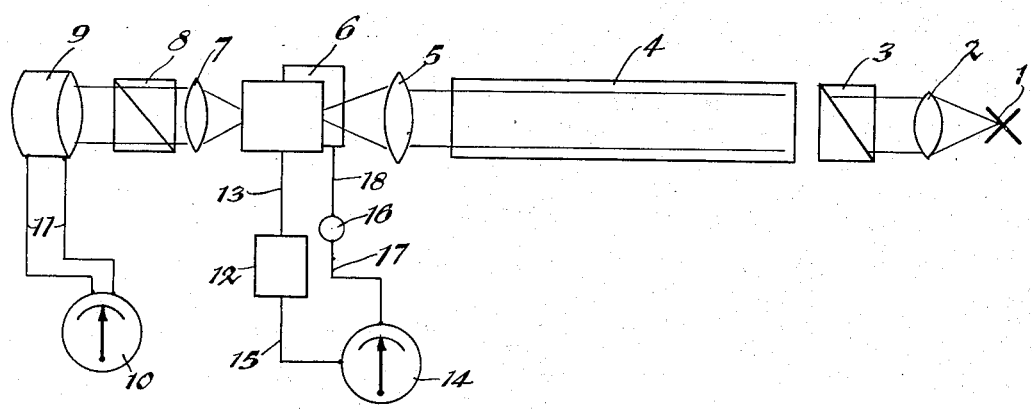
INVENTOR
WILLIAM F. PECK
BY
ATTORNEY Patented June 13, 1944

2,351,539

UNITED STATES PATENT OFFICE 2,351,539

POLARIMETER APPARATUS

William F. Peck, Snyder, N. Y., assignor to Spencer Lens Company, Buffalo, N. Y., a corporation of New York Application December 4, 1941, Serial No. 421,627

3 Claims. (Cl. 88—14)

This invention relates to a new and improved polarimetric apparatus and has particular reference to a new and improved means for determining the rotation of the plane of polarization of substances.

An object of the invention is to provide a new and improved means of the character set forth which does not require a highly skilled operator.

Another object of the invention is to provide a means of the type set forth, which means is simple, efficient and economical to manufacture and which is simple and efficient in operation.

Other objects and advantages of the invention will be apparent from the following description taken in connection with the accompanying drawing, and it will be understood that many changes may be made in the details of construction and arrangement of parts without departing from the scope of the invention as expressed in the accompanying claims. I, therefore, do not wish to be limited to the exact details of construction and arrangement of parts shown and described as the preferred form has been shown by way of illustration only.

Referring to the drawing:

The figure is a diagrammatic view of a polarimetric apparatus embodying the invention.

Referring more particularly to the drawing: 1 represents a light source and 2 is a lens, 3 is a light polarizing member, 4 a sample or specimen container, 5 is another lens, 6 is a Kerr cell, 7 another lens, 8 is a light polarizer and 9 is a photocell.

The micro-ammeter 10 is connected with the photocell 9 through the connections 11.

The Kerr cell 6 is connected to the variable power source 12 by the lead 13 and said source 12 is connected to the volt meter 14 through the lead 15.

The volt meter 14 is connected to the voltage control 16 by the lead 17 and said voltage control 16 is connected by the lead 18 to the Kerr cell 6.

It is pointed out that the axes of polarization of the light polarizer 3 and the analyzer 8 are set at the same angle, that is, they are parallel with each other. Also, it is pointed out that while these members 3 and 8 have been shown in the form of Nicol prisms, sheet polarizing material may be employed if desired.

The method of ascertaining the plane of polarization of a substance is as follows:

The specimen or sample is placed in the sample tube 4 and the light from the light source is directed through the lens 2, polarizer 3 and the sample in the tube 4, lens 5, Kerr cell 6, lens 7, analyzer 8 onto the photocell 9. The light from the source is made parallel by the lens 2 and on passing through the polarizer 3 is polarized by said polarizer 3 and then on passing through the specimen in the sample tube 4 the axis of polarization of the light is rotated by the specimen in said sample tube 4. The rotated beam of light is then converged by the lens 5 to pass through the Kerr cell 6 and is then made parallel again by the lens 7 and then said light passes through the analyzer 8 and strikes the photocell 9.

While passing through the Kerr cell 6 the beam of polarized light, which has been rotated by the sample in the sample tube 4, is rotated back to its original axis position by the voltage supplied to the said Kerr cell 6 by adjusting the voltage control 16 and the said voltage control 16 is adjusted to adjust the voltage applied on the said Kerr cell 6 until the maximum light strikes the photocell 9 as shown by the micro-ammeter 10 and the rotation of the specimen in the sample tube 4 is then read directly from the calibrated scale on the volt meter 14.

It is pointed out that as all that is required of the operator is to insert the sample in said sample holder 4 and adjust the voltage control 16, the operation of the device set forth in this application does not require a highly skilled operator as it is only necessary for the operator to adjust the voltage control 16 until the maximum light reaches the photocell and then the rotation of the specimen is read directly from the calibrated scale on the said volt meter 14.

From the above it will be seen that I have provided simple, efficient and economical means for obtaining all of the objects and advantages of the invention.

Having described my invention, I claim:

1. In a device of the character described, a light source, light polarizing means optically aligned with said light source, light analyzing means optically aligned with said light polarizing means, sample holding means between said light polarizing means and said light analyzing means, and adapted to support the specimen under test, a Kerr cell between said sample holding means and said light analyzing means and optically aligned therewith, an electrical circuit for applying current to said Kerr cell, a photocell in optical alignment with said light analyzing means and adapted to receive light passing therethrough, means for indicating the amount of light reaching said photocell and means in said circuit for varying the voltage of the current applied to said Kerr cell until the maximum amount of light reaches said photocell, and current responsive means in said circuit for measuring the current applied to the Kerr cell to indicate the rotation by the specimen in said sample holder of light passing therethrough.

2. In a device of the character described, a light source, light polarizing means optically aligned with said light source, light analyzing means optically aligned with said light polarizing means, sample holding means between said light polarizing means and said light analyzing means and adapted to support the specimen under test, electrical light rotating means between said sample holding means and said light analyzing means and optically aligned therewith, an electrical circuit for applying current to said light rotating means, a photocell in optical alignment with said light analyzing means and adapted to receive light passing therethrough, means for indicating the amount of light reaching said photocell, means in said circuit for varying the voltage of the current applied to said light rotating means until the maximum amount of light reaches said photocell and current responsive means in said circuit for measuring the current applied to the light rotating means to indicate the rotation by the specimen in said sample holder of light passing therethrough.

3. In a device of the character described, a light source, light polarizing means optically aligned with said light source, light analyzing means optically aligned with said light polarizing means, sample holding means between said light polarizing means and said light analyzing means and adapted to support the specimen under test, electrical light rotating means between said sample holding means and said light analyzing means and optically aligned therewith, optical means optically aligned with said source of illumination for converging the light passing through said sample holding means on said light rotating means, an electrical circuit for applying current to said light rotating means, a photocell in optical alignment with said light analyzing means and adapted to receive light passing therethrough, means for indicating the amount of light reaching said photocell and means in said circuit for varying the voltage of the current applied to said light rotating means until the maximum amount of light reaches said photocell and current responsive means in said circuit for measuring the current applied to the light rotating means to indicate the rotation by the specimen in said sample holder of light passing therethrough.

WILLIAM F. PECK.